INVENTORS
WILLIAM G. KLEHM, JR.
LEWIS L. TANGUY, JR.
BY Francis A. Varallo
AGENT INVENTORS.
WILLIAM G. KLEHM, JR.
LEWIS L. TANGUY, JR.
BY Francis A. Varallo
AGENT United States Patent Office 3,080,560

Patented Mar. 5, 1963

3,080,560

MAGNETIC RECORDING SYSTEM

William G. Klehm, Jr., Short Hills, N.J., and Lewis L. Tanguy, Jr., Phoenixville, Pa., assignors to Burroughs Corporation, Detroit, Mich., a corporation of Michigan Filed Mar. 9, 1960, Ser. No. 13,734

12 Claims. (Cl. 346—74)

This invention relates generally to magnetic recording, and more particularly to circuits for recording digital information on a magnetic medium and for checking that such information has been properly recorded.

The accuracy of the information recorded on a magnetic surface such as that provided by metallic tape, drums or disks is of prime importance in data processing and computing systems. Two well-known methods for checking that the digital information to be stored on the magnetic medium has been properly recorded are hereinafter described.

The first of these methods may be termed "read-back checking." In this method the recorded information is re-read, either by a separate magnetic sensing head located beyond the recording magnetic head which effects the writing of the information, or by subsequent passes of the storage medium under the recording head to read back the previously recorded information. In practice, the read-back information is then checked in logical circuits for proper coding or for agreement with the digital information which was intended for recording. While these methods produce extremely accurate results, they have significant disadvantages. One such disadvantage results from the additional time required for the checking procedure. Another stems from the fact that read-back circuits are required, thereby lessening the economy and simplicity of applications involving only recording.

Another well-known method of checking the recording of information consists in the derivation of a checking signal from some point in the write circuit. This signal is commonly a function of the write current or voltage. Logical circuits are employed to check the signal so derived. This method has a serious disadvantage in that the actual recording flux is not checked. For example, in many applications, a shorted winding in the recording head would go undetected in the latter method, as would other writing malfunctions.

It is, accordingly, an object of the instant invention to provide a highly reliable write-checking method which does not require the use of read-back equipment.

Another object of the invention is to provide write-checking means wherein the recording magnetic flux itself is checked, rather than the write current or voltage.

A further object of this invention is to provide a recording system having the advantage of simultaneous recording and checking, thereby eliminating objectionable delays in the system program.

A still further object of the present invention is to provide a recording system including error detecting arrangements which will produce a signal pulse as an indication of the occurrence of a writing error.

In accomplishing these and other objects there has been provided, in accordance with this invention, a magnetic recording head with at least two windings or alternatively a single center-tapped winding coupled thereto. One winding, or half of the center-tapped winding, may be termed a write winding and is employed for recording; while the other winding, or the other half of the center-tapped winding, functions as a sense or check winding. For each change of writing flux effected by write current flowing through the write winding, there is a voltage induced in the sense winding. The electrical characteristics of these induced voltages are dependent upon the characteristics of the recording flux waveforms, which in turn are a function principally of the write current amplitude, the number of turns of the write winding, and the magnetic material of which the recording head is constructed. The voltages induced in the check winding are applied to suitable discrimination circuits, wherein checking pulses are generated if, and only if, the writing waveforms are satisfactory. The checking pulses are then compared immediately with the information being recorded. Discrepancies between the checking pulses and the input information are detected by comparison means which produce error pulses to signal their occurence. Such simultaneous recording and checking allows for the correction of errors as they occur.

A better understanding of this invention may be had from the following detailed description when read in connection with the accompanying drawings in which.

Before proceeding with a detailed description of the instant recording system and its mode of operation it will be necessary to identify the recording scheme with which the circuit embodiment depicted in FIGS. 1 through 4 is designed to operate. It must be emphasized that the use of this recording method is not mandatory. Other methods which might advantageously employ the checking technique of the instant invention will readily suggest themselves to those skilled in the art, in accordance with the principles set forth hereinafter.

Figures 1, 2, 3:
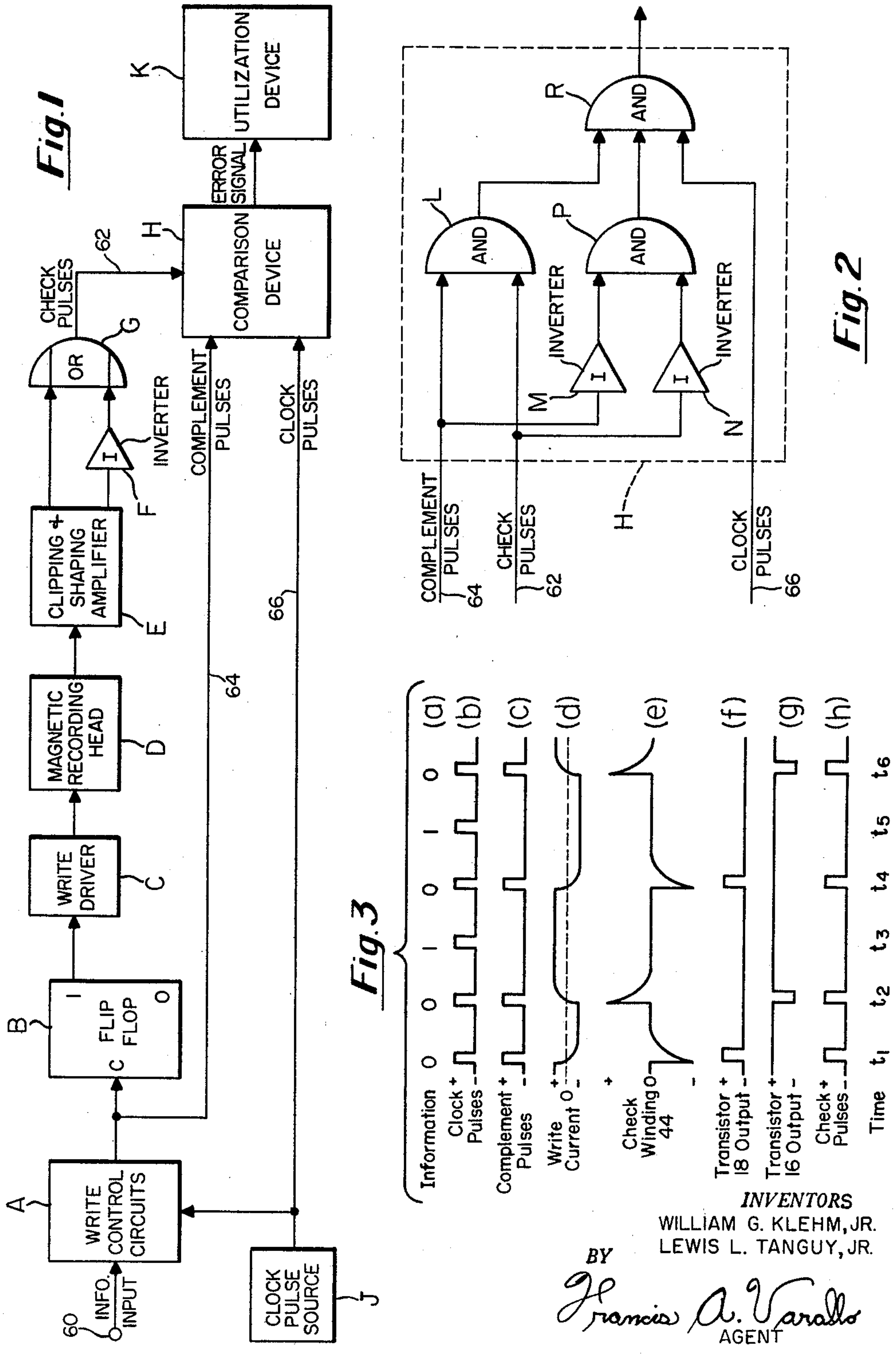
FIG. 1 is a block diagram of an embodiment of the recording system of the instant invention.
FIG. 2 is a block diagram illustrating in detail the components which comprise the "comparison device" depicted in the system of FIG. 1.
FIG. 3 depicts typical waveforms characteristic of the type of magnetic recording compatible with the system of FIG. 1.

FIG. 3 shows in idealized form the waveforms associated with the instant recording system which utilizes a form of the NRZ, non-return-to-zero, method. In this method a change in the writing flux, in either a positive or negative direction, is representative of the recording of a binary "0." The absence of a change of flux in the recording head during the preselected time for recording is representative of the recording of a binary "1."

Assume that the information listed in FIG. 3*a* is to be recorded. The pulses depicted in FIG. 3*c* correspond to the desired information and serve to control the write drivers and the polarity of the write current flowing in the magnetic recording head. Thus, in FIG. 3*d* at time $t_1$, the current flowing through the write winding coupled to the magnetic recording head switches from a positive level to a negative level—this change representing the recording of a binary "0." Likewise at time $t_2$ another "0" is recorded, since the write current switches from a negative to a positive level. It should be noted that for each clock pulse depicted in FIG. 3*b* a bit of information is recorded. At time $t_3$ there has been no change in write current and hence no change in the magnetic flux of the recording head—this condition representing the recording of a binary "1" as previously explained. In like manner a"1" is recorded at time $t_5$ and "0's" at times $t_4$ and $t_6$.

In the embodiment of the invention illustrated by the block diagrams of FIGS. 1 and 2, the information to be recorded is applied to terminal 60 which is connected to the write control circuits A. Clock pulses are applied to control circuits A by source J. The write control circuits generate pulses at a clock time and apply them to the complement terminal "C" of flip-flop B. The "1" output terminal of flip-flop B is connected to write driver C which provides current flow through the write winding of the magnetic recording head D. Depending upon the state of flip-flop B the write driver C will provide current of one polarity or the other. As previously explained, the shift in write current from one polarity to the other in response to the change in state of the flip-flop by a pulse applied to the complementing terminal thereof, is indicative of the recording of a binary "0." A constant write current of either polarity at a clock time indicates the recording of a binary "1."

In accordance with the instant invention the recording head D has an additional winding, termed a check or sense winding, wound thereon. A change in write current from one polarity to the other shifts the magnetic state of the recording head and the resulting change in flux induces a voltage in the check winding. This induced voltage is applied to a clipping and shaping amplifier E. The function of amplifier E is to discriminate against induced voltages which are of sub-standard amplitude because of some malfunction in the recording. Output pulses indicative of the proper recording of the input information are generated by the amplifier and are available at each of the output terminals thereof. The pulses appearing respectively on these output terminals are of opposite polarity depending upon the polarity of the voltages induced in the check winding of the recording head. The inverter F reverses the polarity of one of these output signals so that it is the same as that of the signals appearing at the other terminal of amplifier E. These output signals are then combined in OR circuit G and appear as check pulses on line 62. These check pulses, depicted in FIG. 3*h* are applied to a comparison device H which generates an error signal whenever a discrepancy exists between the check pulses and the information being recorded. This error signal is then applied to a utilization device K, which may comprise a suitable aural, or visual, alarm in addition to control means for halting the recording process whenever an error is detected.

FIG. 2 illustrates one possible logic arrangement for the comparison device H. The waveforms of FIG. 3 will emphasize the following circuit details. During satisfactory recording a check pulse will be generated for each complement pulse, i.e., a check pulse should be present on line 62 each time flip-flop B changes from one remanant state to the other. Moreover, the check pulses and complement pulses should always occur during a clock pulse time. Thus the concurrence or absence of both a complement pulse and its corresponding check pulse during a clock pulse time is considered normal operation. The presence of a complement pulse and the absence of a corresponding check pulse, or vice versa, is indicative of a recording error. The comparison device H depicted in FIG. 2 will generate an error pulse for each clock pulse time in which a complement pulse is present and a check pulse is absent, or vice versa.

During a recording cycle the following conditions may exist at any clock time: case 1—a check pulse is present on line 62 corresponding to a complement pulse on line 64, as illustrated at time $t_2$ in FIG. 3; case 2—neither a check pulse nor a complement pulse is present, as at time $t_3$ in FIG. 3; case 3—a complement pulse is present on line 64 but there is no corresponding check pulse on line 62; case 4—a check pulse is present on line 62 but there is no corresponding complement pulse on line 64.

The operation described in cases 1 and 2 is considered normal and represent respectively the satisfactory recording of a binary "0" and a binary "1." Conversely, in case 3 the write control circuit A has ordered the writing a binary "0" as evidenced by the complement pulse produced thereby, but the "0" has not been recorded due to some malfunction in the system. In effect, a binary "1" has been recorded in its place. Likewise, in case 4, the write control circuit A ordered the writing of a binary "1," but the "1" was not recorded. Instead, the check pulse appearing on line 62 would seem to indicate that a "0" had been recorded. The comparison device H is designed to generate error signals whenever case 3 or case 4 operation is present, and to produce no error signals during the case 1 and case 2 operation.

The comparison device H depicted in FIG. 2 consists of two inverters M and N, and three AND gates L, P and R. In order for an error signal to be generated by output AND gate R, the voltages applied concurrently to its three input terminals must be of like polarity.

Consider the operation of the comparison device H for each of the aforementioned cases of operation. In case 1, check and complement pulses of like polarity are applied to the input terminals of gate L, and due to the action of inverters M and N, like pulses of a polarity opposite to that of the pulses applied to gate L, are applied to the input terminals of gate P. Since the respective inputs to gates L and P are of opposite polarities, the outputs of the latter gates will necessarily be of opposite polarities. The outputs from gates L and P are applied to output gate R and since these outputs are dissimilar in polarity, gate R is not conditioned for delivering an error signal.

A similar condition exists in case 2 wherein neither a check pulse nor a complement pulse is present at a clock time. In this instance, the voltage level on lines 62 and 64, in the absence of the latter pulses, has the same polarity. The polarity of the output voltage level af gate L is a function of the voltage levels applied to its input terminals. The polarity of the voltage levels on lines 62 and 64 is inverted in the inverters M and N and these voltage levels are applied to gate P. Thus the output voltage level of gate P will be opposite in polarity to that of gate L, and again gate R will not be properly conditioned to generate an error signal.

In cases 3 and 4 where either a check pulse or a complement pulse is present, but not both pulses, the polarity of the voltage levels on the input terminals of gate L will be dissimilar, and likewise even after the action of inverters M and N, the input voltage levels to gate P will be dissimilar. With pulses of opposite polarity, respectively, on the input terminals of each of the gates L and P, the outputs of these gates will have the same polarity. This latter polarity has been chosen to be the same as that of the clock pulses appearing on line 66. Moreover, the concurrence of like polarity outputs from gates L and P, and clock pulse source J will condition AND gate R for producing an error signal pulse indicative of case 3 or 4 operation. This error signal is then applied to utilization device K.

Figure 4:
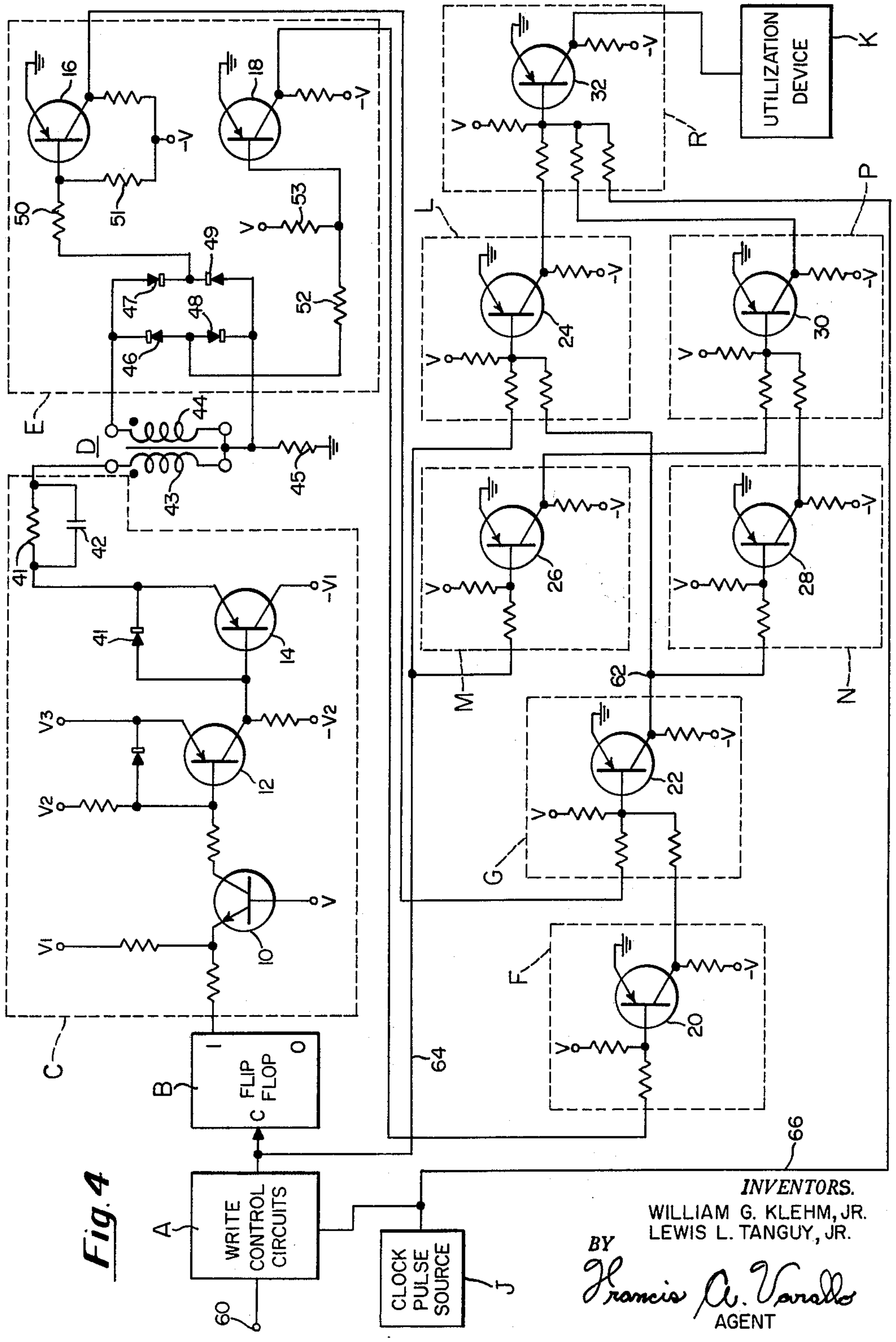
FIG. 4 is an electrical schematic illustrating the recording system depicted in FIGS. 1 and 2.

The operation of the circuit embodiment of FIG. 4 will now be described in detail in connection with the waveforms of FIG. 3. The reference characters employed in FIGS. 1–3 have been used in FIG. 4 to designate like portions of the recording system. Conventional graphical symbols have been used to designate the emitter, collector and base electrodes of each of the transistors. It should be noted that the invention is not restricted to the use of the type of transistor depicted in FIG. 4, but may employ other types in accordance with established design procedures well known to those skilled in the art. The positive and negative supply voltages for the transistors listed respectively in order of increasing absolute magnitude are V, $V_1$, $V_2$, $V_3$ and $-V$, $-V_1$, $-V_2$. The plus and minus signs appearing on the voltage waveforms of FIG. 3 represent relative polarities of various portions of the waveforms and not absolute polarities with respect to ground reference.

The information to be recorded is applied to terminal 60 where it enters the write control circuits A. Clock pulses from source J are likewise applied to control circuit A to insure that the output complement pulses from circuit A occur at a clock time. Flip-flop B is any bistable device capable of remaining in one or the other of two stable states, one of said states furnishing a substantially different output signal level than the other, and which can be switched from either of said states to the other by the momentary application of pulses thereto. Thus the output pulses from the control circuits A complement flip-flop B. These complement pulses are depicted in FIG. 3*c*. It may be assumed that when the flip-flop is in the "1" state, the voltage level on the "1" terminal is positive with respect to the voltage present on the same terminal when the flip-flop is in the "0" state.

The write driver C comprises transistors 10, 12 and 14 and their associated components. It will be assumed that at time $t_2$ as shown in FIG. 3, a complement pulse is applied to flip-flop B which causes the flip-flop to switch from the "1" state to the "0" state. The negative-going potential on the "1" output terminal of the flip-flop is applied to the emitter of transistor 10 and biases the transistor to conduction. The collector electrode of transistor 10 is coupled to the base electrode of transistor 12. As a result of the conduction of transistor 10 the potential on the base of transistor 12 becomes less positive and transistor 12 is driven to conduction. The collector of transistor 12 is connected to the base of transistor 14. The conduction of transistor 12 causes the collector electrode to go positive, thereby biasing transistor 14 to non-conduction. The collector current of transistor 12 flows through the magnetic recording head as will hereinafter be explained in detail.

Before proceeding with a further description of the operation of the write driver, the characteristics of the magnetic recording head D will be considered briefly. The recording head D comprises a pair of windings 43 and 44, the former winding being designated as the "write" or "recording" winding, the latter as a "check" or "sense" winding. A dot has been affixed adjacent that end of each of the two windings which has the same polarity of voltages with respect to the other end thereof for a predetermined direction of magnetization of the recording head core. Although windings 43 and 44 have been depicted as separate windings, it should be noted that these windings may in fact comprise portions of a single center-tapped winding and in the subsequent discussion and claims, when reference is made to a pair of magnetic head windings, this alternate construction is meant to be included within the language thereof.

Summarizing the circuit operation described thus far, at time $t_2$ flip-flop B switches from the "1" state to the "0" state in response to a complement pulse from the write control circuits, transistors 10 and 12 are conducting and transistor 14 is not conducting. Recording current flows from the collector of transistor 12 through diode 41 and the RC network comprising resistor 41 and capacitor 42, into the dot end of write winding 43, and through resistor 45 to ground. Recording current flowing into the dot end of winding 43 will be assumed to be positive-going as depicted in FIG. 3*d* and may be viewed conveniently across resistor 45. The RC network provides a step wavefront, i.e., a fast initial rise or fall time, for the current through the write winding 43 when the flip-flop shifts from one state to the other.

The flow of current into the dot end of winding 43 induces a voltage in check winding 44, which has a positive polarity at the dot end thereof, as shown in FIG. 3*e* at $t_2$ time. The waveforms of FIG. 3*e* are those appearing at the dot end of check winding 44.

The clipping and shaping amplifier E comprises transistors 16 and 18 and a diode steering network consisting of diodes 46, 47, 48 and 49. In the absence of any induced voltages in check winding 44, transistor 16 is in a conducting state and the collector electrode thereof is at a relatively positive, or ground potential; transistor 18, on the other hand, is biased to non-conduction and its collector electrode is at a relatively negative potential. Diodes 48 and 49 serve to bypass to ground the currents flowing respectively in the base circuits of transistors 16 and 18, thereby minimizing the flow of extraneous currents through winding 44, which might adversely affect the recording process.

The positive potential at the dot end of check winding 44 causes current to flow in a path through diode 47, resistor 50 to the base of transistor 16, through resistor 51 and the internal impedance of the −V supply to ground, and through resistor 45 to the non-dot end of winding 44. This current flow through resistors 50 and 51 results in voltage drops thereacross which cause the base of transistor 16 to assume a positive potential. Transistor 16 is biased to non-conduction. The collector of transistor 16 drops from substantially ground potential to a negative potential, which latter potential is present so long as the voltage induced across winding 44 is of sufficient amplitude to exceed the predetermined threshold potential necessary for biasing transistor 16 to non-conduction. Such threshold potential is a function of the voltage divider resistors 50 and 51. The values of these resistors are selected such that voltages induced in winding 44 having a sub-standard amplitude are unable to develop sufficient positive potential on the base of transistor 16 to turn the latter transistor Off. The presence of an induced voltage in winding 44 of insufficient amplitude to bias transistor 16 Off is indicative of some malfunction in the recording process. Such a condition results in no output pulse from transistor 16 and, accordingly, an error signal is generated in comparison device H as hereinbefore explained in connection with the block diagram of FIGS. 1 and 2.

The negative output pulse of transistor 16, depicted in FIG. 3*g*, is applied directly to OR circuit G which comprises transistor 22. The application of a negative pulse to either or both of the input terminals of the OR circuit drives transistor 22 to conduction, and a positive pulse is generated on the collector electrode thereof. The positive output pulses of transistor 22 are designated "check pulses," and are depicted in FIG. 3*h*. Each check pulse produced by transistor 22 is then compared at a clock pulse time with the complement pulse from which it is derived. The comparison is made by a device H which comprises transistors 24, 26, 28 and 30 and 32. Transistors 26 and 28 are employed as inverters and correspond respectively to inverters M and N depicted in FIG. 2; transistors 24, 30 and 32 are AND gates corresponding respectively to gates L, P and R, depicted in FIG. 2.

Before proceeding with a detailed description of the operation of the comparison device it will be helpful to give some attention to the electrical characteristics of the basic circuits which make up the device. With respect to the inverters, if a negative polarity voltage is applied to the base of the inverter transistor, the latter transistor will be driven to conduction and its collector electrode will assume a positive potential. On the other hand, if a positive voltage is applied to its base electrode, the transistor will be non-conductive and its collector electrode, relatively negative. In the AND circuits, if all the signals applied concurrently to the input terminals of the AND circuit transistor have a positive polarity, the transistor will remain in a non-conducting state and the potential on its collector electrode will be negative. Therefore, a negative polarity on the collector is indicative of the presence of positive polarity signals on all of the input terminals. Obviously if any or all of the inputs to the AND circuits have a negative polarity, the transistor is biased to conduction, and a positive potential appears on its collector electrode.

The check pulse generated by transistor 22 and appearing on line 62, is coupled simultaneously to the bases of transistors 24 and 28. The complement pulse associated with this latter check pulse appears on line 64 and is coupled simultaneously to the base of the AND circuit transistor 24 and to the inverter transistor 26. Since the check pulse and corresponding complement pulse applied to AND transistor 24 are both of a positive polarity, a negative pulse is produced on the collector of transistor 24, which negative pulse is further coupled to one of the input terminals of the AND circuit 32. The positive check pulse applied to transistor 28 is inverted thereby and appears as a negative pulse on the collector electrode thereof. Similarly, the positive complement pulse applied to inverter transistor 26 also appears as a negative pulse on the collector of transistor 26. The negative pulses appearing respectively on the collectors of transistors 26 and 28 are applied to the input terminals of AND circuit transistor 30, which produces a positive pulse. This last-mentioned pulse is then applied to a second input terminal of AND circuit transistor 32. Moreover, a positive clock pulse is applied to the third input terminal of transistor 32.

Thus the signal voltages appearing respectively on the input terminals of transistor 32 consist of one negative pulse and two positive pulses. Accordingly, transistor 32 assumes a conducting state and the collector electrode thereof is at a positive potential. This positive potential is indicative of satisfactory circuit operation. Conversely, the presence of a negative potential, at a clock time, on the collector of transistor 32 in response to three signals of positive polarity applied concurrently to its input terminals, is indicative of a recording error. Such a negative potential is interpreted as an error signal by utilization device K.

Reference to FIG. 3 indicates that at time $t_3$ write control circuit A has not complemental flip-flop B. Therefore there has been no change in the polarity of the write current, no voltage has been induced in check winding 44, and no check pulses have been generated in the amplifier circuit. This condition is indicative of the recording of a binary "1" as previously explained. Since this operation is presumed to be normal, no error signal will be generated in the comparison device.

At time $t_4$ a complement pulse is delivered to flip-flop B and the flip-flop shifts from the "0" state to the "1" state. The voltage appearing on the "1" output terminal of the flip-flop is now relatively positive and as a result transistor 10 is made to assume a non-conducting state. In response to the non-conduction of transistor 10, transistor 12 also assumes a non-conducting state. The negative potential on the collector of transistor 12 biases transistor 14 to conduction. Write current flows from ground through resistor 45, into the non-dot end of winding 43, through the parallel network of resistors 41 and capacitor 42, through transistor 14 and then back to ground through the internal impedance of the $-V_1$ supply. This negative-going write current is illustrated in FIG. 3*d* at $t_4$ time.

The flow of current into the non-dot end of winding 43 induces a voltage in check winding 44 which has a negative polarity at the dot end thereof, as shown in FIG. 3*e*. The positive potential at the non-dot end of check winding 44 causes current to flow in a path including resistor 45, the internal impedance of course V, resistors 53 and 52, diode 46, and the dot end of winding 44. This current flow through resistors 53 and 52 causes the base of transistor 18 to assume a negative potential which biases transistor 18 to conduction. The collector of transistor 18 rises from a negative potential to substantially ground potential, which latter potential is present so long as the voltage induced across winding 44 is of sufficient amplitude to exceed the predetermined threshold potential necessary for biasing transistor 18 to conduction. Such threshold potential is a function of resistors 52 and 53. The values of these resistors are selected such that negative voltages induced in winding 44 having a sub-standard amplitude are not able to develop a sufficiently negative potential on the base of transistor 18 to turn the latter transistor On. The presence of such a sub-standard amplitude potential indicates a recording error. If no output pulse is generated by transistor 18 to correspond with the complement pulse which effected the writing of the digital information, an error signal will result.

The positive output pulse generated by transistor 18 and depicted in FIG. 3*f* at $t_4$ time, is inverted by transistor 20 of inverter F. The negative pulse appearing on the collector of transistor 20 is applied to OR circuit transistor 22 which generates a check pulse on line 62. The subsequent operation of the circuit is identical with that hereinbefore described in connection with the check pulse resulting from the output of transistor 16.

When either one or the other of the complement and check pulses is absent due to some malfunction in the recording process, as in cases 3 and 4 operation, the comparison circuit of FIG. 4 will perform as follows: the polarity of the voltage level on one of the input terminals of AND circuit transistor 24 will be negative while the voltage level on the second input terminal will be positive. Likewise the voltage levels on the input terminals of AND circuit transistor 30 will be dissimilar in polarity. The respective collector electrodes of transistors 24 and 30 will be at a positive potential. Since the clock pulse also has a positive polarity, the three input terminals of transistor 32 will all have a positive polarity. The condition results in the production of a negative error signal on the collector of transistor 32, which error signal is applied to the utilization device K.

From the foregoing description of the invention it is evident that the present technique for checking that digital information has been properly recorded results in efficient and dependable system performance. It must be understood that the embodiment of the invention chosen for purposes of disclosure is meant to be illustrative only, and is not limitative of the invention. Many modifications will be suggested to those skilled in the art, and all such variations as are in accord with the principles discussed previously are meant to fall within the scope of the appended claims.

What is claimed is:

1. A magnetic system for recording information comprising in combination a magnetic recording head, said recording head having a plurality of windings coupled thereto, said windings being mutually coupled by the magnetic flux induced in said recording head by current flow in one or more of said windings, drive means connected to a first of said windings, said drive means causing current flow through said first winding in accordance with the information to be recorded, said current flow resulting in a change of magnetic flux in said recording head whereby a voltage is induced in a second of said windings, the amplitude of said induced voltages being a function of the recording flux waveform, amplifier means coupled to said second winding and adapted to receive said induced voltages, circuit means associated with said amplifier means for establishing a predetermined threshold potential, said amplifier means generating output signals in response to induced voltages having an amplitude equal to or greater than said threshold potential and producing no output signals for induced voltages having a sub-standard amplitude, said last voltages being indicative of malfunctions in the recording process, and means for comparing the output signals of said amplifier means with the information being recorded.

2. A magnetic system for recording binary information comprising in combination a magnetic recording head, said recording head having at least first and second windings coupled thereto, said windings being mutually coupled by the magnetic flux induced in said recording head by current flow in one or more of said windings, current driver means coupled to said first winding, said driver means providing current flow in either direction through said first winding in accordance with the binary information to be recorded, said current flow resulting in a change of magnetic flux in said recording head whereby a voltage is induced in said second winding, steering means connected to said second winding, amplifier means connected to said steering means and adapted to receive the induced voltages generated in said second winding, circuit means associated with said amplifier means for establishing a predetermined threshold potential, said amplifier means generating an output signal in response to induced voltages having an amplitude equal to or greater than said threshold potential and producing no output signals for induced voltages having a substandard amplitude, said last voltages being indicative of malfunctions in the recording process, and means for comparing the output signals of said amplifier means with the binary information being recorded.

3. A magnetic system for recording binary information comprising in combination a magnetic recording head, said recording head having at least first and second windings coupled thereto, said windings being mutually coupled by the magnetic flux induced in said recording head by current flow in one or more of said windings, a bidirectional current driver coupled to said first winding, control means adapted to be pulsed from a source of binary information, a bistable device, means coupling the output of said control means to said bistable device whereby said device is switched from one stable state to its other stable state, the output voltage of said bistable device being applied to said current driver, said current driver providing current flow in one direction or the other through said first winding depending upon the respective states of said bistable device, said current flow resulting in a change of magnetic flux in said recording head whereby a voltage is induced in said second winding, steering means connected to said second winding, amplifier means connected to said steering means and adapted to receive the induced voltages generated in said second winding, circuit means associated with said amplifier means for establishing a predetermined threshold potential, said amplifier means generating output signals in response to induced voltages having an amplitude equal to or greater than said threshold potential and producing no output signals for induced voltages having a substandard amplitude, said last voltages being indicative of malfunctions in the recording process, and means for comparing the output signals of said amplifier means with the binary information being recorded.

4. A magnetic recording system as defined in claim 3 wherein said bidirectional current driver comprises first, second and third current amplifying devices, said first amplifying device being connected to said bistable device and assuming either a conducting or a nonconducting state in response to the respective output voltages of said bistable device, said second amplifying device being connected to said first amplifying device, said second amplifying device being conditioned by said first device to assume a state of conduction identical thereto, said third amplifying device being coupled to said second device and to said first winding of said recording head, unidirectional current conducting means connecting said second amplifying device to said first winding of said recording head, said third device being conditioned by said second device to assume a state of conduction opposite thereto, said second amplifying device supplying current in one direction to said first winding by way of said unidirectional current conducting means and said third amplifying device supplying current in the opposite direction to said first winding.

5. A magnetic recording system as defined in claim 4 wherein said first, second and third current amplifying devices are respectively first, second and third transistors, and said unidirectional current conducting means is a diode, each of said transistors having an emitter, a collector and a base electrode, said diode having a pair of terminals, the emitter electrode of said first transistor being connected to said bistable device, means connecting the collector of said first transistor to the base of said second transistor, the collector of said second transistor being connected in common to the base of said third transistor and to a first of said diode terminals, and means connecting in common the emitter electrode of said third transistor and the second of said diode terminals to said first winding of said recording head.

6. A magnetic recording system as defined in claim 5 wherein said transistors are all of the junction variety, and said first transistor has a conductivity type opposite to that of said second and third transistors.

7. A magnetic system for recording binary information comprising in combination a magnetic recording head, said recording head having at least a write winding and a check winding coupled thereto, said windings being mutually coupled by the magnetic flux induced in said recording head by current flow in one or more of said windings, current driver means connected to said write winding, said driver means providing current flow of either polarity through said write winding in accordance with the binary information being recorded, said current flow resulting in a change of magnetic flux in said recording head whereby a voltage is induced in said check winding, steering means connected to said check winding, amplifier means connected to said steering means and adapted to receive the induced voltages generated in said check winding, circuit means associated with said amplifier means for establishing a predetermined threshold potential said amplifier means comprising first and second current amplifying devices, the voltage induced in said check winding being applied respectively to one or the other of said current amplifying devices by said steering means in accordance with the polarity of said induced voltages, said current amplifying devices generating output signals in response to said induced voltages having an amplitude equal to or greater than said threshold potential and producing no output signals for induced voltages having a substandard amplitude, said last voltages being indicative of malfunctions in the recording process, and means for comparing the output signals of said amplifier means with the binary information being recorded.

8. A magnetic recording system as defined in claim 7 wherein said steering means comprise first and second pairs of diodes, the diodes in each of said pairs being connected in series and being poled in opposite directions, each of said pairs of diodes being connected in parallel across said check winding, the junction of said first pair of series diodes being coupled to said first amplifying device and the junction of said second pair of series diodes being coupled to said second amplifying device.

9. A magnetic recording system as defined in claim 8 wherein said first and second amplifying devices are respectively first and second transistors, each of said transistors having an emitter, a collector and a base electrode, said circuit means for establishing a predetermined threshold potential comprising first, second, third and fourth impedances, said first and second impedances connecting the base of said first transistor respectively to the junction of said first pair of diodes and to a first source of bias potential, said third and fourth impedances connecting the base of said second transistor respectively to the junction of said second pair of diodes and to a second source of bias potential, the emitter electrodes of said transistors being connected in common to a source of reference potential, said output signals generated by said transistors appearing respectively on the collector electrodes thereof.

10. A magnetic system for recording binary information comprising a magnetic recording head, said recording head having at least a write winding and a check winding coupled thereto, said windings being mutually coupled by the magnetic flux induced in said recording head by current flow in one or more of said windings, a bidirectional current driver coupled to said write winding, write control means adapted to receive binary information from a source thereof, said control means being adapted to be pulsed from a source of clock pulses, said control means generating at clock pulse times complement pulses corresponding to said binary information, a bistable device having an input terminal and a pair of output terminals, circuit means for applying said complement pulses to the input terminal of said bistable device whereby said device is switched from one stable state to its other stable state, means for applying the voltage appearing on one of the output terminals of said bistable device to said current driver, said current driver providing current flow in one direction or the other though said write winding depending upon the respective states of said bistable device, said current flow resulting in a change of magnetic flux in said recording head whereby a voltage is induced in said check winding, steering means connected to said check winding, amplifier means connected to said steering means and adapted to receive the induced voltages generated in said check winding, circuit means associated with said amplifier means for establishing a predetermined threshold potential, said amplifier means generating check pulses in response to induced voltages having an amplitude equal to or greater than said threshold potential and producing no check pulses for induced voltages having a substandard amplitude, said last voltages being indicative of malfunctions in the recording process, comparison means for determining whether or not there is correspondence between the complement pulses generated by said write control means and the check pulses generated by said amplifier means, said comparison means producing an error signal in the absence of such correspondence, and means for utilizing said error signal.

11. A magnetic recording system as defined in claim 10 wherein said comparison means comprises first, second and third logical AND circuits and logical inverter means, said first and second AND circuits having a pair of input terminals and an output terminal, said third AND circuit having three input terminals and an output terminal, means for applying said complement pulses and said check pulses concurrently to the respective input terminals of said first AND circuit, means including said inverter means for applying concurrently to the respective input terminals of said second AND circuit pulses opposite in polarity to those applied to said first AND circuit, means connecting the output terminals of said first and second AND circuits respectively to a pair of input terminals of said third AND circuit, means for applying said clock pulses to the third of said input terminals of said third AND circuit, said error signal being generated by said third AND circuit and appearing on the output terminal thereof, and means connecting said last output terminal to a utilization device.

12. A magnetic recording system as defined in claim 11 wherein each of said logical AND circuits comprises a transistor having an emitter, a collector and a base electrode, a plurality of impedance means connecting the respective input terminals of each of said AND circuits to the base electrode of the transistor associated therewith, the emitter electrodes of each of said transistors being connected in common to a source of reference potential, and circuit means coupling the respective base and collector electrodes of each of said transistors to sources of bias potential.

References Cited in the file of this patent

UNITED STATES PATENTS 2,919,968 Fernandez-Rivas et al. ---- Jan. 5, 1960

FOREIGN PATENTS 515,300 Belgium ---------------- Nov. 4, 1953